Patented June 7, 1932

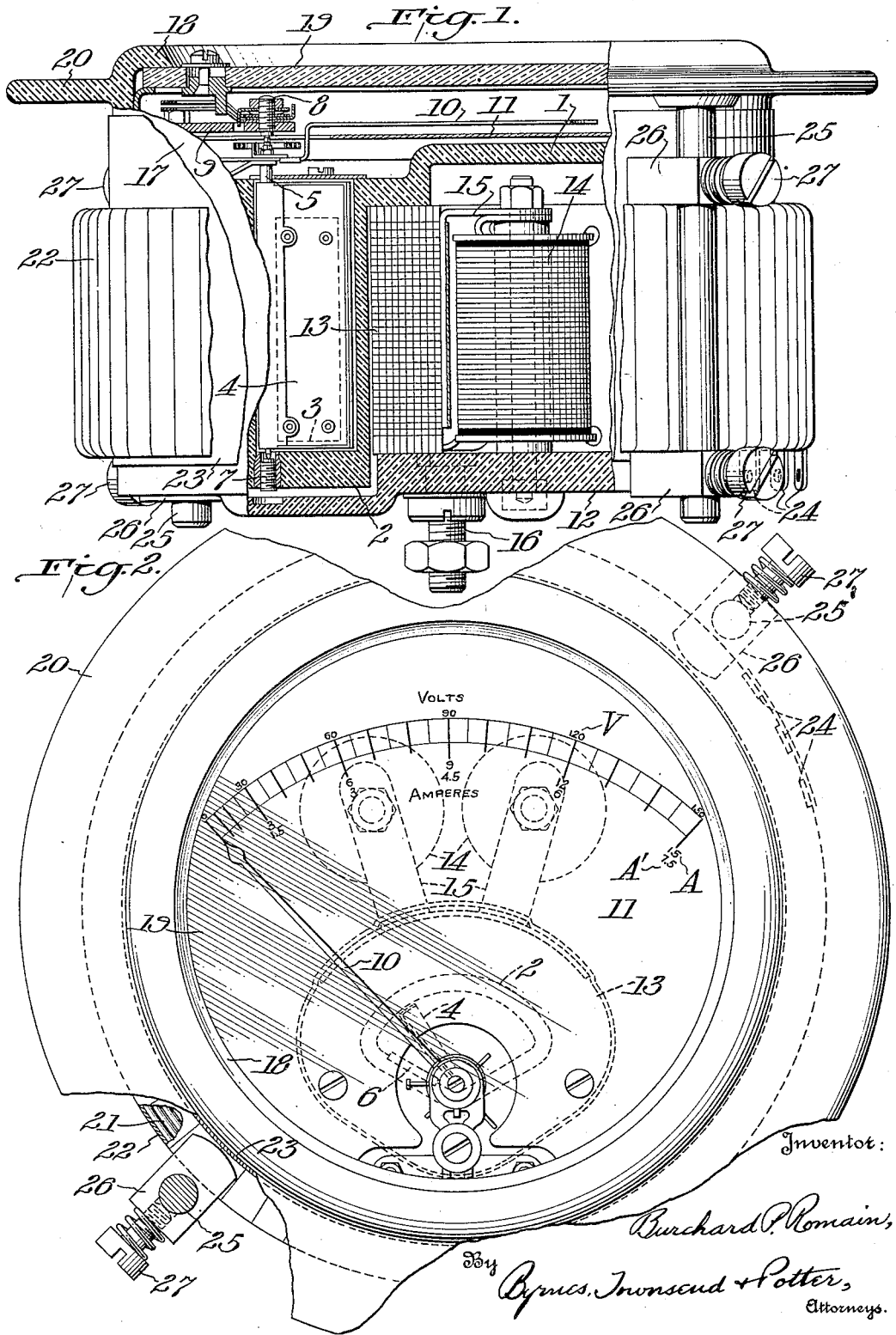

1,861,720

UNITED STATES PATENT OFFICE

BURCHARD P. ROMAIN, OF NEWARK, NEW JERSEY, ASSIGNOR TO WESTON ELECTRICAL INSTRUMENT CORPORATION, OF NEWARK, NEW JERSEY, A CORPORATION OF NEW JERSEY

ELECTRICAL MEASURING INSTRUMENT

Application filed May 19, 1931. Serial No. 538,563.

This invention relates to electrical measuring instruments, and particularly to alternating current instruments of the iron vane type.

An object of the invention is to provide a double range or double purpose alternating current measuring instrument of a simple and economical construction, but which is characterized by the accuracy and reliability of more complex and more expensive instruments. A further object is to provide such an instrument of the iron vane type in which one field winding is mounted within the instrument casing and one or more field windings are mounted outside of the casing. More particularly, an object is to provide an instrument which comprises, in effect, an alternating current voltmeter and one or more ammeter windings mounted at the exterior of the voltmeter casing.

These and other objects of the invention will be apparent from the following specifications when taken with the accompanying drawing, in which, Fig. 1 is a side elevation, with parts shown in section, of one embodiment of the invention, and Fig. 2 is a fragmentary plan view of the same.

The invention is illustrated as embodied in an iron vane instrument of the general type described and claimed in the patent to Weston, No. 1,714,202, granted May 21, 1929.

In the drawing, the reference numeral 1 identifies the front base member, preferably formed of molded insulating material which has rearwardly offset portions providing a sector-shaped chamber 2 within which the movable iron vane 3 and the damper 4 are supported for pivotal movement by the shaft 5. The fixed vane 6 is mounted upon one radial wall of the chamber 2 or may be secured thereto in the molding of the front base member. One bearing 7 of the moving system is carried by the rear wall of chamber 2 and the other bearing 8 is mounted on a bridge member 9 which is secured to the front base member 1. The moving system includes a pointer 10 which is movable over a scale that is printed or engraved on the card or plate 11.

The rear base member 12 has mounted thereon the voltmeter winding 13 and resistance spools 14 the electrical connections 15 between these parts preferably serving as the mechanical support for the voltmeter field winding. The other terminals of the resistance spools 14 are connected to the voltmeter terminals 16.

The front and rear base members are secured to each other in any suitable manner, for example as described in the Weston patent, and are then housed within a cylindrical casing 17 which is provided with an inturned flange 18 against which the glass 19 is seated, and with a projecting flange 20 by which the instrument may be mounted upon a panel board or the like. Attention is directed to the fact that the outer casing 17 is formed of a molded plastic and not of metal.

In accordance with this invention, one or more ammeter ranges are provided, without substantially increasing the size of the instrument, by mounting the ammeter field winding or windings outside of the casing 17. As shown in Fig. 2, the ammeter winding consists of a number of turns of wire 21 which are preferably taped, as indicated at 22, to form a self-supporting annulus having an internal diameter but slightly in excess of the outer diameter of the casing 17. To facilitate the movement of the ammeter winding onto the casing, a sheet of paper 23 may first be slipped within the taped winding. Terminals 24 are brought out from the extremities of the ammeter winding and also, when a multiple range ammeter is desired, from intermediate points on the winding. To maintain the ammeter winding in predetermined axial adjustment with respect to the iron vanes, a plurality of posts 25 extend rearwardly from the flange 20 of the casing 17, and carry adjustable arms 26 that lie at opposite ends of the ammeter winding and are fixed to the rods by clamping screws 27.

In addition to avoiding a substantial increase in the size of the instrument, the location of the ammeter winding outside of the casing avoids heating within the instrument casing and, due to the better cooling of the exterior winding, will frequently permit use of smaller size wire. In comparison with the voltmeter winding which consists of a great number of turns of fine wire, the ammeter winding comprises relatively few turns of comparatively large wire.

It is to be noted that the axes of the exterior and interior field windings are not similarly disposed with respect to the iron vanes and the moving system which are eccentrically located with respect to the axis of casing 17. The scale illustrated in Fig. 2 shows the graduations and the series of scale markings used with one particular voltammeter constructed in accordance with this invention. With the scale accurately graduated for a voltage range of from 0 to 150 volts, as indicated by the series of scale markings V, current values within the ranges of from 0 to 15, and from 0 to 7.5 amperes are indicated with equal accuracy on the same series of graduations by the sets of scale markings A and A', respectively; it being understood that the number of turns and the axial location of the ammeter windings are so chosen that the deflection of the pointer 10 for the maximum current values coincides with the deflection for the maximum voltage reading.

While I have described the invention in connection with one particular type of iron vane instrument construction, it will be apparent that it is equally applicable to other styles of such instruments and to double purpose instruments other than voltammeters. For example, instruments for measuring either current or voltage values of two different orders of magnitude may be constructed by locating the field winding for the lower order of values within the casing and mounting the other winding at the exterior of the casing, and preferably directly upon the same. Though intended primarily for the measurement of alternating current and voltage, the instrument may be used for direct current measurements with but slightly reduced accuracy.

It will therefore be understood that the invention is not limited to the particular construction herein described and illustrated, and that various changes may be made in the relative size, shape and arrangement of the parts and in the relative electrical properties of the windings, without departing from the spirit of the invention as set forth in the following claims.

I claim:

1. An electrical measuring instrument of the type including a field winding, a fixed iron vane, a moving system including an iron vane, and a casing housing said winding and moving system, characterized by the fact that a second field winding cooperating with said moving system is mounted at the exterior of said casing.

2. In an electrical measuring instrument, the combination with a moving system including an iron vane, a fixed iron vane cooperating with the vane of said moving system, a field winding surrounding the said vanes, and a casing housing said moving system and winding, of a second field winding slidable over said casing, and means for retaining said second winding in fixed position with respect to said casing.

3. In an electrical measuring instrument, the combination with a non-metallic casing and a moving system of the iron vane type within said casing, of a field winding within and a field winding outside of said casing for cooperation with said moving system.

4. In a device of the class stated, the combination with a non-metallic casing and an iron vane measuring instrument within said casing, of a field winding surrounding said casing and adapted, upon the flow of current therethrough, to deflect the moving system of said measuring instrument.

5. The invention as set forth in claim 4 wherein the measuring instrument within said casing comprises a voltmeter, and the field winding cooperates with said moving system to constitute an ammeter.

6. In an electrical measuring instrument, the combination with a casing, an iron vane moving system pivotally supported within said casing for movement about an axis eccentric to the axis of said casing, a field winding within said casing and operative to effect angular displacement of said moving system in accordance with the current flow through said winding, a pointer forming a part of said moving system, and a graduated scale over which said pointer is movable; of a winding exterior to said casing and operative, upon the flow of current therethrough, to deflect said pointer over said scale in accordance with substantially the same law of current flow-angular displacement as that of said first winding.

7. The invention as set forth in claim 6, wherein said exterior winding is of annular form and slidably mounted upon said casing, in combination with means carried by said casing for retaining said exterior winding in fixed position thereon.

In testimony whereof, I affix my signature.

BURCHARD P. ROMAIN.